United States Patent [19]
Lemmer et al.

[11] Patent Number: 5,144,182
[45] Date of Patent: Sep. 1, 1992

[54] SKEWED ROTOR ASSEMBLY

[75] Inventors: Jerome J. Lemmer, Oakdale; Gary B. O'Malley, Fridley; Rickie A. Evenson, Ham Lake, all of Minn.

[73] Assignee: Onan Corporation, Minneapolis, Minn.

[21] Appl. No.: 754,631

[22] Filed: Sep. 4, 1991

[51] Int. Cl.$^5$ .............................................. H02K 1/06
[52] U.S. Cl. ........................................ 310/217; 310/43; 310/65; 310/194; 310/261; 310/235
[58] Field of Search ............... 310/42, 43, 61, 65, 310/91, 194, 215, 217, 218, 234, 235, 236, 261, 270

[56] References Cited

U.S. PATENT DOCUMENTS

| | | | |
|---|---|---|---|
| 2,511,693 | 6/1950 | Burghoff | 336/107 |
| 2,671,865 | 3/1954 | Nippert | 310/232 |
| 3,014,140 | 12/1961 | Tupper | 310/71 |
| 3,071,750 | 1/1963 | Heselwood | 439/391 |
| 3,156,037 | 11/1964 | Warner | 29/564.5 |
| 3,304,447 | 2/1967 | Lindt | 310/71 |
| 3,355,801 | 12/1967 | Priddy | 29/598 |
| 3,603,825 | 9/1971 | Sheridan et al. | 310/194 |
| 3,659,130 | 4/1972 | Lilley et al. | 310/234 |
| 3,718,750 | 2/1973 | Sayers | 174/94 R |
| 3,974,407 | 8/1976 | Dochterman | 310/71 |
| 3,979,615 | 9/1976 | Neff | 310/71 |
| 3,984,908 | 10/1976 | Ackley | 29/736 |
| 4,003,128 | 1/1977 | Dochterman | 29/596 |
| 4,028,573 | 6/1977 | Terrone | 310/217 |
| 4,038,573 | 7/1977 | Hillyer et al. | 310/71 |
| 4,130,331 | 12/1978 | Neff et al. | 439/396 |
| 4,177,397 | 12/1979 | Lill | 310/71 |
| 4,181,393 | 1/1980 | Lill | 439/402 |
| 4,215,464 | 8/1980 | Miller | 29/596 |
| 4,287,446 | 9/1981 | Lill et al. | 310/71 |
| 4,340,829 | 7/1982 | McCoy | 310/71 |
| 4,578,608 | 3/1986 | Mech | 310/112 |
| 4,642,885 | 2/1987 | King | 29/596 |
| 4,656,378 | 4/1987 | Atherton et al. | 310/71 |
| 4,673,834 | 6/1987 | Wrobel | 310/71 |
| 4,694,560 | 9/1987 | Barrera | 29/564.1 |
| 4,757,602 | 7/1988 | Evenson | 29/597 |
| 4,904,893 | 2/1990 | Snider et al. | 310/260 |
| 4,922,604 | 5/1990 | Marshall et al. | 29/598 |

Primary Examiner—Steven L. Stephan
Assistant Examiner—Dennis R. Haszko
Attorney, Agent, or Firm—Merchant, Gould, Smith, Edell, Welter & Schmidt

[57] ABSTRACT

A dynamo assembly comprising a stator assembly and rotor assembly as shown. The preferred rotor assembly comprises two end caps, a single wire strand, a collector ring assembly and a plurality of laminants. The two end caps are preferably identical to one another, and oriented with the wire wrapped in two coils therearound. The laminants are supported between the two and caps, in a skewed manner. An advantageous arrangement for engagement between the collector ring assembly and wire held on the end caps is provided. A unique method of molding the collector ring assembly without internal inserts is also disclosed.

17 Claims, 10 Drawing Sheets

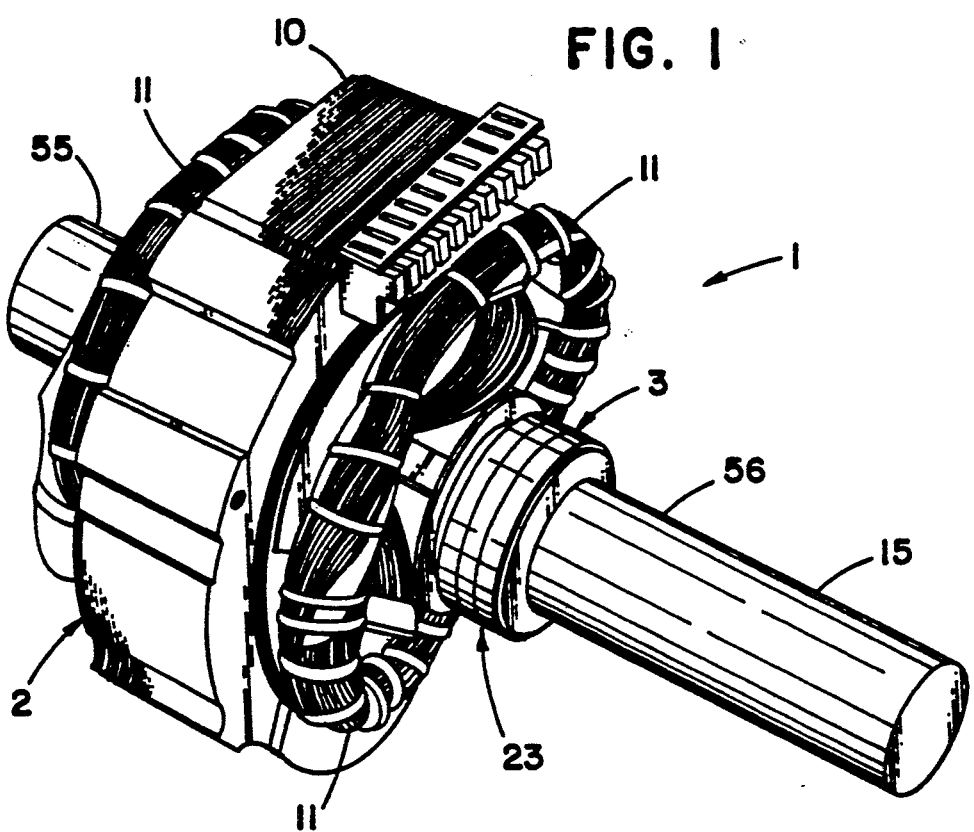
FIG. I
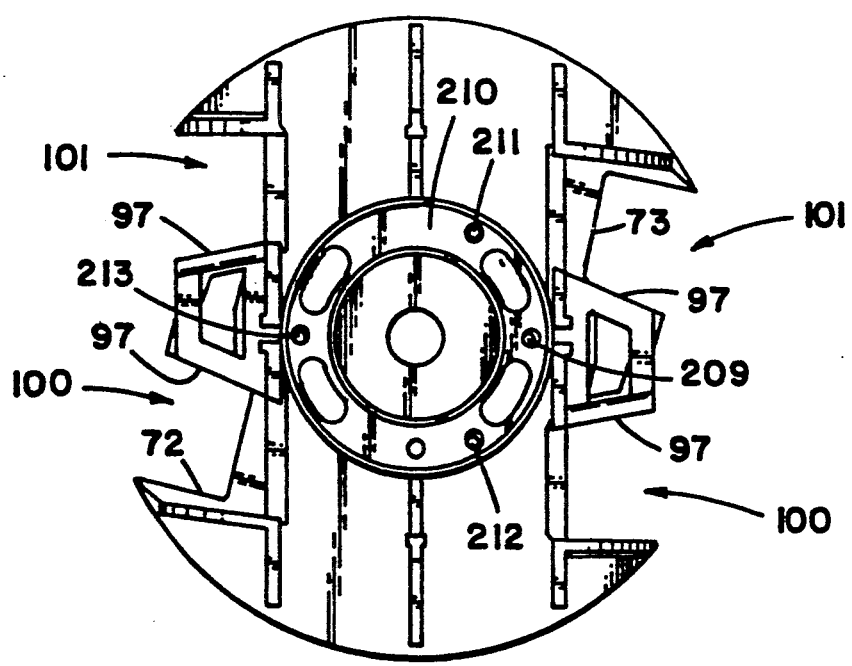
FIG. II

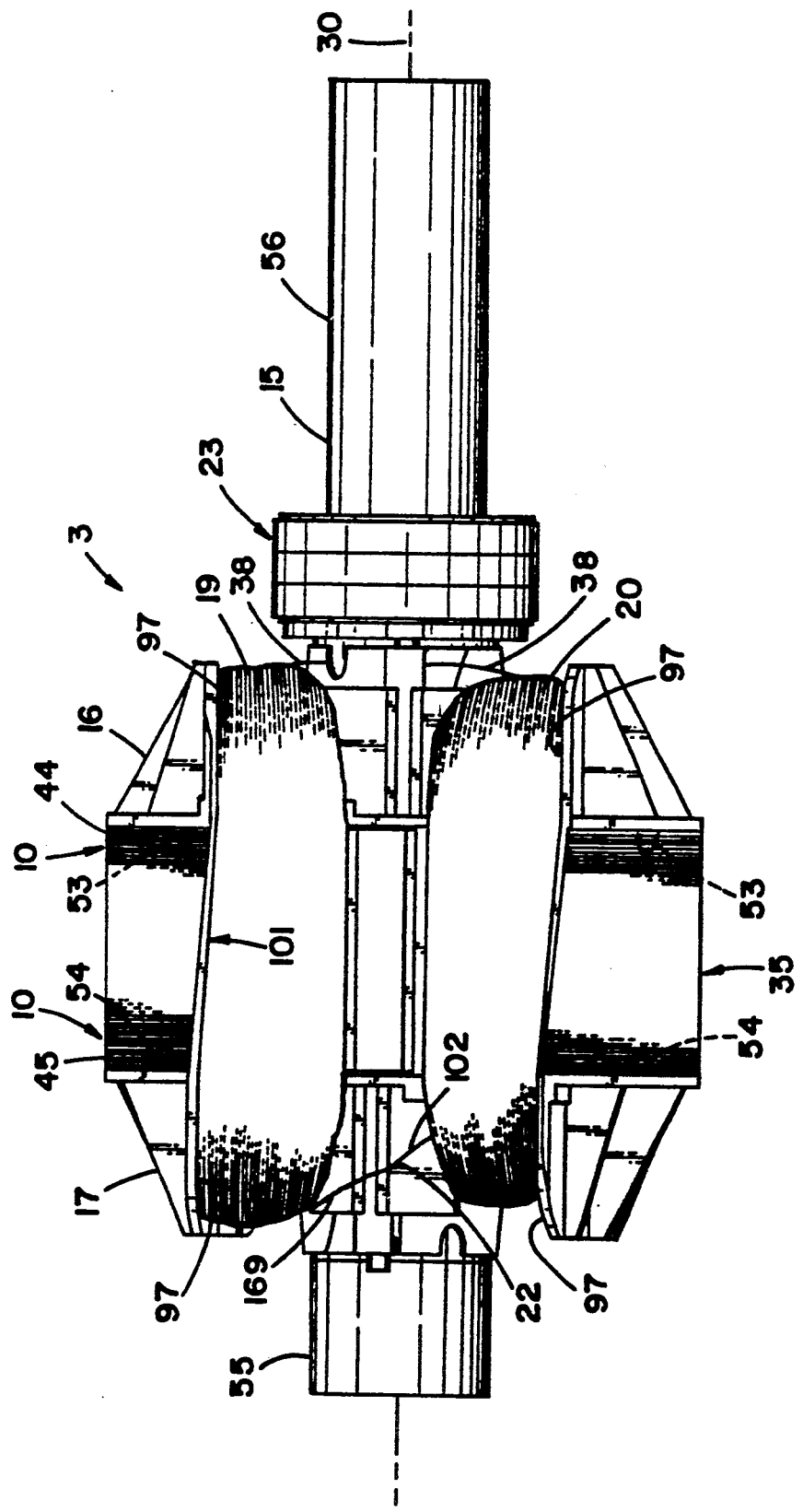

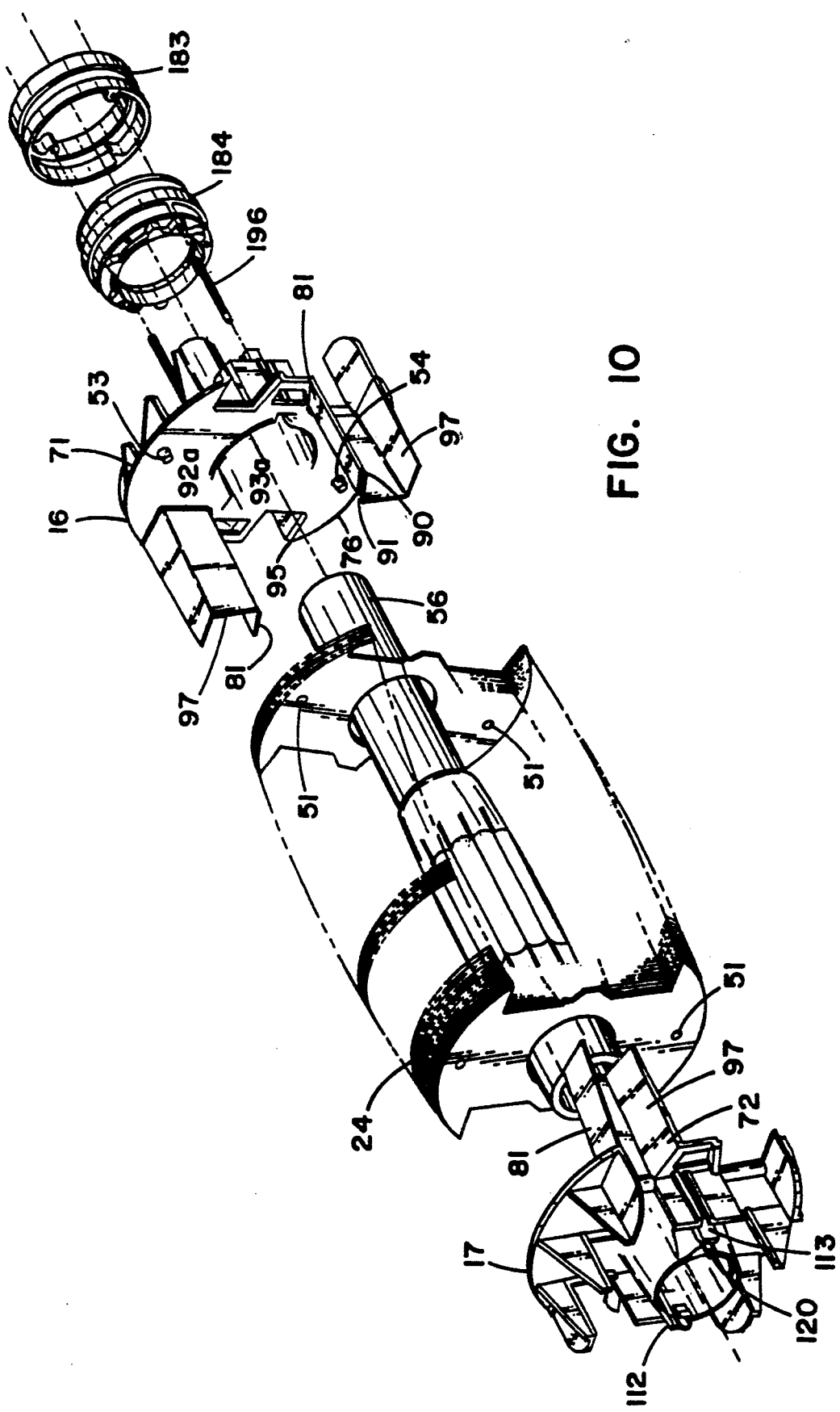

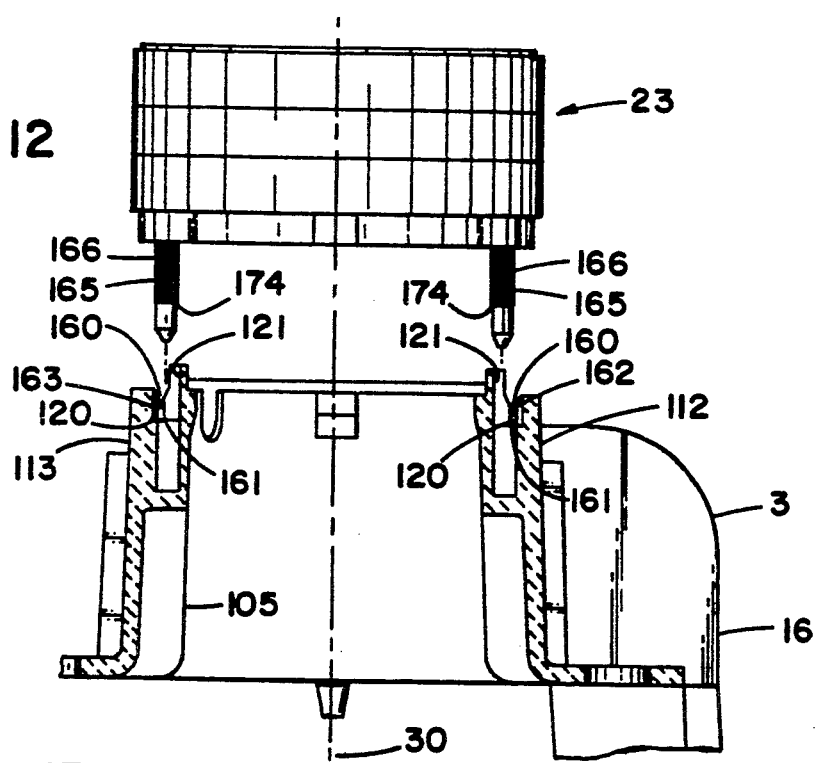
FIG. 12
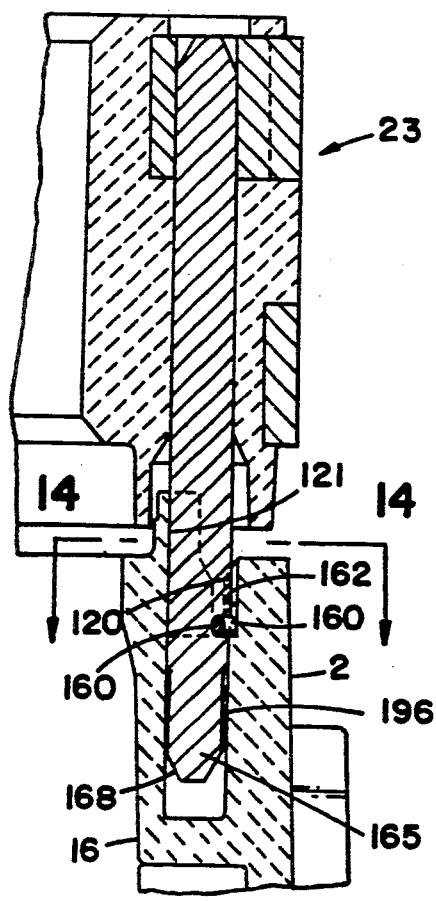
FIG. 13
FIG. 14

SKEWED ROTOR ASSEMBLY

FIELD OF THE INVENTION

The present invention relates in general to electrical apparatus and in particular to a generator set including a dynamo or dynamo-electric assembly, having a rotor assembly therein. The invention concerns preferred constructions of such assemblies and methods relating thereto.

BACKGROUND OF THE INVENTION

Dynamos or dynamo-electric assemblies have found wide use in generator sets. Such sets generally include an engine, fueled by gasoline, natural gas or diesel fuel, which is operated to rotate the rotor of a dynamo or generator, within the rotor's magnetic field, to produce electricity. Such systems are commonly used, for example as marine generators, power units at construction sites or similar sites, as emergency generators, and as power generators in remote areas.

The portion of the generator associated with generation of electrical energy includes a rotor mounted on an axle such that it can be rotated within a stator. The rotor supplies the source of the magnetic field. The rotor includes a winding or multiple windings of electrical conductor (wire). Similarly, the stator includes a plurality of windings. As the rotor, with its wire windings or coils, is rotated within the stator, the rotor's magnetic field sweeps across the stator conductors producing an alternating current in the stator coils. A collector ring assembly, in electrically conductive relation with the rotor coil, provides for electrical communication between the rotating members and stationary members.

Generally, stators and rotors have laminate constructions. That is, for example, the body of a stator generally comprises a plurality of aligned laminates, in which the stator wire coils are mounted. Such systems are shown, for example, in U.S. Pat. Nos.: 4,642,885; 4,694,560; 4,215,464; 3,984,908; 3,979,615; 4,287,446; 4,181,393; 4,922,604; 4,340,829; 4,656,378; and, 4,177,397, the disclosures of which are incorporated herein by reference. In known stator constructions, a stack of laminations comprises a stack of ferromagnetic plates fixed together to form a core. After the core is covered by a layer of insulation, windings (coils) of magnetic wires are positioned therein in a predetermined pattern, depending on the nature and direction of the magnetic flux supplied by the rotor. As the magnetic flux passes the coils in the stator, a voltage is then generated by the magnetic flux crossing the magnet wires. Conductive leads connect the stator magnet wires to an external circuit.

The laminations of the stator generally define a bore extending therethrough, in which the rotor is positioned. The rotor axle extends generally perpendicularly to the surfaces of the stator laminations, positioning the rotor centrally within the bore. The rotor includes wire coil(s) to which an electrical current is supplied producing a magnetic field.

Generally, the laminations of the assembly are skewed, to ensure development of a more desirable magnetic field. Typically, it has been laminations of the stator which are skewed. Reasons for this include the fact that the wire coil(s) of the rotor has typically been more readily constructed, if wound on a non-skewed system with conventional constructions; and, since the stator remains stationary in operation, skewing without inhibition of operation has generally been more straightforward for the stator than the rotor for conventional constructions.

Assembly of generator sets, especially the rotor and stator assemblies of a dynamo, has typically been relatively labor-intensive. A number of specifically-directed wire coils are involved, each of which needs to be mounted and oriented properly. There has been a need for improvement in constructions to achieve more readily-manufactured systems, at least for reduction of cost and provision of convenience. In addition, improvements to enhance performance have generally been sought.

SUMMARY OF THE INVENTION

According to one aspect of the present invention there is provided a preferred rotor assembly comprising first and second end caps, a skewed stack of laminates positioned between the first and second end caps, and a wire strand wrapped in first and second coils around the first and second end caps. Preferably each end cap has a head portion and a pair of legs. In the rotor assembly, the end caps are oriented with the legs extending between the head portions. Each end cap leg preferably has at least one skewed wall panel, oriented to accept a skewed stack of laminates by engagement with a surface portion or edge portion thereof. Preferably the first and second end caps are substantially identical to one another.

In the preferred rotor assembly, each of the legs of the end caps is defined by an inner panel, a central panel and an outer panel; the panels being oriented to define longitudinal leg channels. In the rotor assembly, the longitudinal leg channels extend between the head portions of the first and second end caps. Preferably the outer panel and central panel of each leg is skewed, to accommodate the skewing of the stack of laminates. In the preferred rotor assembly, the first and second coils extend through the longitudinal channels defined in the legs. More specifically, the first coil extends through two of the legs, and the second coil extends through the other two legs.

In the preferred embodiment, the end cap head portions have an outer surface with a surface rib arrangement thereon. The rib arrangement is positioned underneath the coils, to space a portion of the coils from the surface portion of the end cap and generate an air flow channel for cooling, between the outer surface of the head portion and the coil. Preferably the rib arrangement comprises six surface ribs, oriented with three ribs positioned to receive the first coil and three ribs positioned to receive the second coil.

Also in the preferred embodiment the end cap outer surface has four corner panels extending therefrom, in first and second aligned pairs. The corner panels are preferably oriented to define first and second coil channels extending across the end cap outer surface. In the rotor assembly, the first coil is positioned in a first one of the coil channels, and the second coil is positioned in the second one of the coil channels.

The preferred end cap also includes a central mounting cone thereon, projecting outwardly from the end cap outer surface. The coil channels are generally defined between the mounting cone and the associated corner panels. In the preferred embodiment a central gusset is positioned in association with each of the two coil channels extending across the end cap outer surface. Preferably the corner panels have rounded outer corners, to facilitate coil winding without catching.

In the preferred embodiment, first and second wire terminal blocks are oriented on the outer surface of the end cap head portions. The terminal blocks include a longitudinal wire channel or bite therein for receipt of a wire end portion. Preferably the wire strand which forms the first and second coils is a single wire strand having first and second end portions, one each of which is positioned within one each of the wire bites in the two end blocks. That is, a first end or end portion of the wire is associated with a first terminal block and a second end or end portion of the wire is associated with a second terminal block.

The rotor assembly preferably includes a collector ring assembly having means in direct electrically conductive communication with the wire end portions by contact with portions of the wires received within the longitudinal wire bites. In the preferred embodiment, this means comprises first and second terminal pins associated with the collector ring assembly, each of which preferably has longitudinal splines, teeth or ridges thereon, which dig into the wire to provide the electrical contact. Preferably the arrangement is such that each pin is driven against its associated wire from a direction generally perpendicular or orthogonal thereto, but off-set slightly from direction against a center thereof. This is illustrated in the drawings, and described in greater detail hereinbelow. In general it concerns provision of a conductor pin having a generally cylindrical shape with a central longitudinal axis, and orientating the conductor pin with that central longitudinal axis extending generally orthogonal to longitudinal extension of the wire end portions. For the preferred embodiment this involves aligning the collector ring assembly such that the conductor pins extend generally longitudinal to a central rotation axis of the overall rotor assembly.

Preferably the bite or interaction between the conductor pins and the wire involves a sufficient number of splines on each pin, such that a minimum of four splines penetrate the magnet wire, for good electrical contact.

The preferred rotor assembly according to the present invention is provided from two end caps, each of which is of integral molded construction. That is, each is a unit molded with all of the features described provided thereon. A particular preferred arrangement is illustrated in the drawings.

Also according to the present invention a preferred collector ring assembly is provided. The preferred collector ring assembly comprises: an insulator body defining a central rotor shaft bore having a central longitudinal axis first and second spaced electrically conductive collector rings positioned on the insulator body and in spaced relation to one another; and, first and second cylindrical conductor pins. The preferred first conductor pin is oriented in extension generally parallel to the insulator body rotor shaft bore central axis and is in electrically conductive communication with the first of the collector rings. The preferred second cylindrical conductor pin is oriented generally parallel to the first cylindrical conductor pin, and is provided in electrically conductive communication with the second collector ring. A preferred such assembly is illustrated in the drawings. Preferably, each conductor pin has a conical end and also has an outer cylindrical surface with a plurality of longitudinal splines thereon. Also, preferably a relatively smooth portion is provided between the conical end and the beginning of the splines.

According to the present invention a method is provided for creating electrical connection between an insulated wire and a collector such as the conductor pin of ring assembly is provided. The method generally comprises the steps of positioning an insulated wire end portion in a bite, providing a conductor pin having a conical end and a cylindrical outer surface with a plurality of longitudinal splines thereon; and driving the conductor pin against the insulated wire end portion in a direction with the longitudinal spline of the pin directed orthogonal to a longitudinal extension of the wire end portion (i.e., orthogonal to a longitudinal extension of a central axis of the wire end portion), and with at least two of the conductor pin splines cut through the insulation of the wire portion and part-way into to the wire. Preferred numbers of bites and depths of bites to achieve desired electrical connection, are described hereinbelow in detail. Preferably, the pin is aligned with its central axis off-set from direct extension through the center of the wire.

BRIEF DESCRIPTION OF THE DRAWINGS

FIG. 1 is a fragmentary schematic perspective view of the rotor and stator assembly according to the present invention.

FIG. 2 is an enlarged fragmentary side elevational view of a rotor according to the present invention.

FIG. 8 being a view rotated about axis 77 90° relative to the view seen in FIG. 6.

FIG. 10 is an exploded perspective view of a rotor assembly according to the present invention. FIG. 10 generally being an exploded view corresponding to the arrangement shown in FIGS. 2 and 3.

FIG. 11 is an end elevational view of the arrangement shown in FIGS. 2, 3 and 10, without wire coils and laminants thereon.

FIG. 12 is an enlarged exploded schematic partially cross-sectional view of an arrangement according to the present invention; in FIG. 12, interaction between a collector ring assembly and a rotor end cap being viewable.

FIG. 13 is an enlarged fragmentary cross-sectional view corresponding to a portion of the arrangement shown in FIG. 12; the view of FIG. 13 including having the collector ring assembly illustrated in cross-section and schematically indicating interaction between the collector ring assembly and an engaged wire.

FIG. 14 is an enlarged fragmentary schematic cross-sectional view taken generally along line 14—14, FIG. 13.

DETAILED DESCRIPTION OF THE INVENTION

Figure 3:
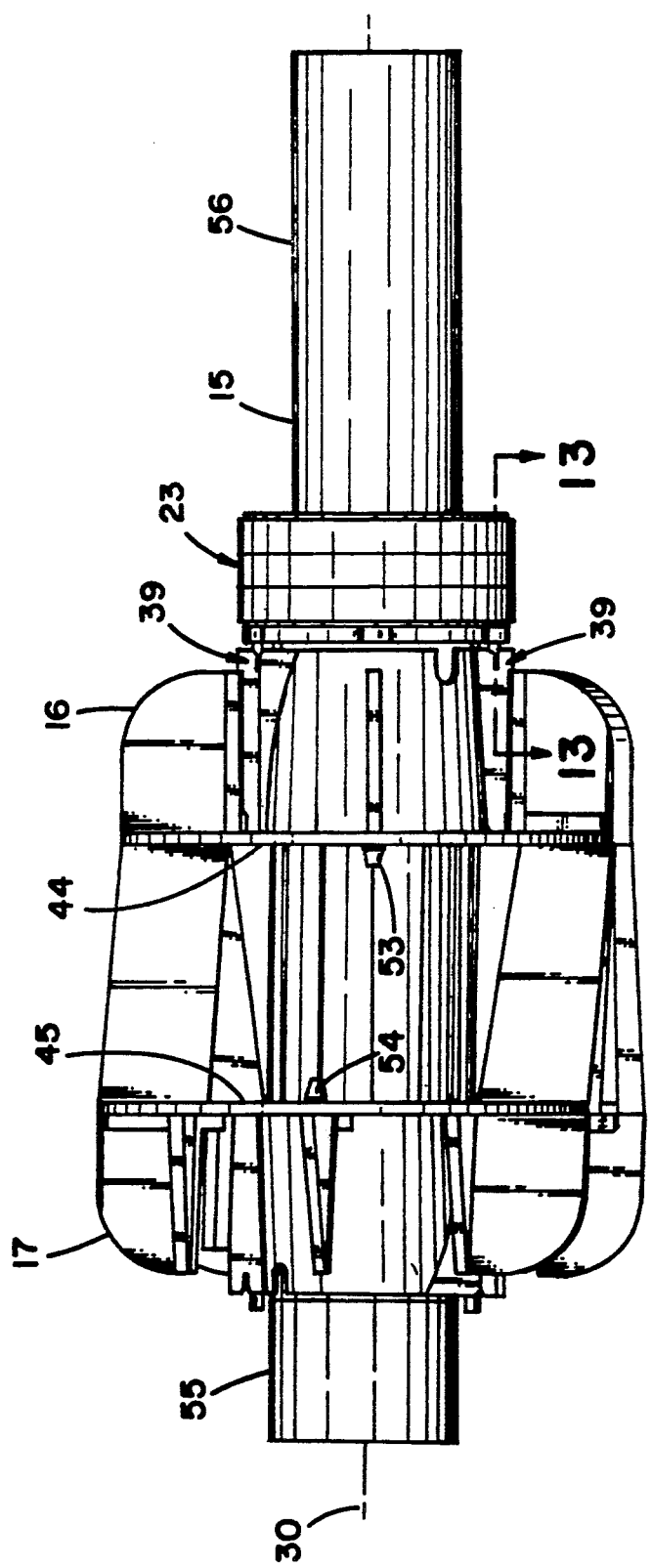
FIG. 3 is a side elevational view of the assembly shown in FIG. 2 illustrated rotated about 90° about axis 30 with respect thereto and depicted without wire coils and laminants thereon.

The reference numeral 1, FIG. 1, generally designates a dynamo assembly according to the present invention. The dynamo assembly 1 of FIG. 1 is shown in perspective, with the drawing being a fragmentary schematic. It is intended to reflect the principles of the present invention, regardless of the specific embodiment in which applied. Assembly 1 includes a stator assembly or stator 2 and a rotor assembly or rotor 3.

The stator 2 comprises a plurality of laminates 10. The laminates 10 of stator 10 are not skewed, but can comprise conventional stator laminate material. The stator 2 includes a plurality of conductor or stator windings 11. The windings typically include quadrature, battery and power windings. Various wire connector systems may be utilized. In FIG. 1 no particular arrangement for the attachment of leads to the windings 11 is illustrated.

Rotor 3 comprises a rotor shaft 15 having a pair of rotor end caps (not shown in FIG. 1, see FIG. 2) mounted thereon. Two wire coils 19 and 20 extend around end caps 16 and 17. Coils 19 and 20 are two coils formed in a single continuous strand of wire 22. The two free ends or end portions of wire 22 conductively engage a portion of collector ring assembly 23. Means, not shown, providing electrical communication with two terminals of collector ring assembly 23 allow current to flow through the coils 19 and 20, upon rotation of the rotor 3 within the stator producing a magnetic field which induces an alternating current in the stator windings 11.

As previously indicated, the laminates 10 of the stator 2 are not skewed. However, as will be seen from descriptions concerning other figures hereinbelow, the laminates 24 of the rotor 3 are skewed. This results in an advantageous construction. The present invention concerns enablement of such a construction in an efficient and effective manner. Features concerning this, and other advantageous characteristics of the assembly, will be understood from detailed descriptions of the rotor assembly and collector ring assembly.

Overall Rotor Assembly—Gross Features

Attention is now directed to FIGS. 2 and 3, in which the overall rotor assembly 3 is depicted in side elevation. The preferred rotor assembly 3 depicted generally has a two-fold axis of symmetry 30. That is, when rotor assembly 3 is rotated around axis 30 by 180° it appears substantially the same as it did before rotation. FIG. 3 illustrates assembly 3 rotated around axis 30 by about 90° relative to FIG. 2.

Still referring to FIGS. 2 and 3, assembly 3 comprises rotor shaft 15, collector ring assembly 23 and coil assembly 35. Coil assembly 35 comprises first and second end caps 16 and 17 having wire 22 thereon positioned in two longitudinally spaced coils 19 and 20 (the wire 22 not being depicted in FIG. 3). Wire 22 is a single strand of wire encased in a thin layer of insulation and having two end portions 38 (only one end portion being fully visible in FIG. 2, the other being on an opposite side, as per the 180° axis of symmetry), which terminate in the vicinity of, and in electrically conductive relationship with, the collector ring assembly 23; the regions of termination being shown at 39 in FIG. 3. Specific means for engagement between wire ends and collector ring 23 are described hereinbelow, in substantial detail.

The coil assembly 35 of a fully-assembled rotor 3 according to the present invention also includes thereon a plurality of laminates 24 (FIG. 2) about which the wire coils 19 and 20 are wound (the laminates 24 not being shown in FIG. 3). It will be understood that coil assembly 35 generally includes a plurality of laminates stacked between surfaces 44 and 45 of end caps 16 and 17 respectively. In general, for preferred embodiments, each of the laminates 24 is identical to all others; however, in total the laminates 24 are skewed relative to one another, as described hereinbelow, for advantage.

Figure 4:
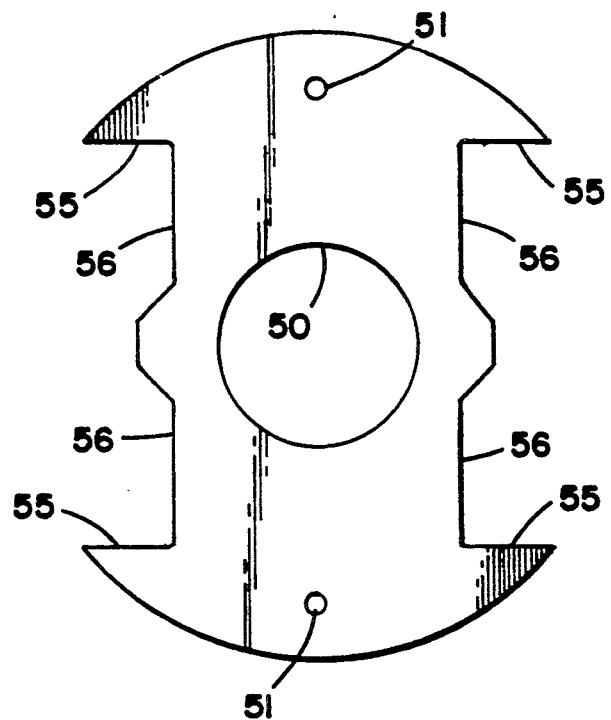
FIG. 4 is a top view of a laminant for use in preferred assemblies according to the present invention.

In FIG. 4 a plan view of rotor laminate 24 is shown. Laminate 24 includes central bore 50 through which rotor shaft 15 extends during assembly. Anchor holes 51 are provided for engagement with one or the other of pins 53 and 54, FIG. 2, if and when the laminate 24 is one of the end laminates against either surface 44 or 45. The plurality of laminates 24 have been stacked and skewed, rotor shaft 15 is pressed into the central bore 50 of the laminations 24. End caps 16 and 17 are then added to the stack such that surfaces or edges 55, 56, FIG. 4, engage or align with selected portions of end caps 16 and 17 as shown hereinbelow.

In the preferred embodiment, end caps 16 and 17 are identical to one another, and are assembled to generate the desired 180° axis of symmetry described hereinabove. Individual features of the end caps 16 and 17 provide for a high degree of efficiency in assembly and advantage in assembly and operation. These features at least concern: a structure allowing for ease of insulating and accepting of the laminates 24, in the desired skewed arrangement; ease of positioning the wire coils; ease of connection of the wire ends to the collector rings; provision of air flow passageways for cooling of the coils during use; and means for convenient winding of the coils. These are described hereinbelow in greater detail.

Still referring to FIGS. 2 and 3, the rotor shaft 15 may be described as having a drive end 55 and a bearing end 56. The bearing end 56 is the end on which the collector ring assembly 23 is positioned. The drive end 55 connects to appropriate drive means in the overall dynamo assembly 1, not shown, and is the end rotationally driven during operation.

The Rotor End Caps

As indicated above, for the preferred embodiment end caps 16 and 17 are identical to one another. The preferred end caps 16, 17 are depicted in detail in Figs. 5, 6, 7, 8 and 9.

Figure 5:
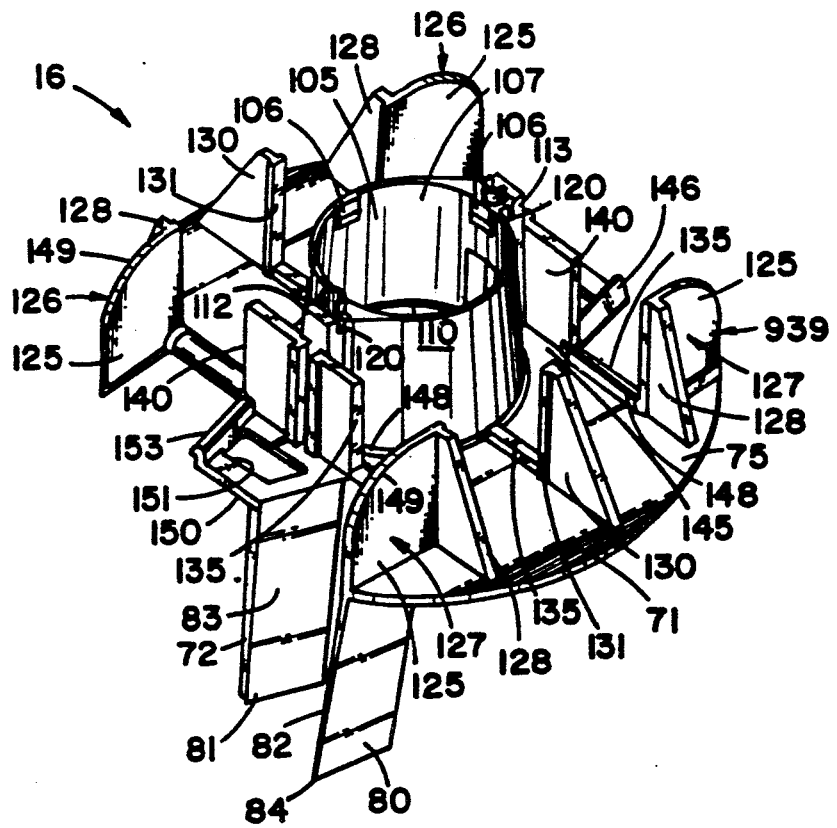
FIG. 5 is a perspective view of an end cap usable in rotor assemblies according to the present invention.

In FIG. 5, a perspective view of one of the end caps, for example end cap 16, is depicted. End cap 16, FIG. 5, comprises a head portion 71 and first and second legs 72 and 73 (only leg 72 being viewable in FIG. 5, both of legs 72 and 73 being viewable in FIGS. 6–9).

Figure 7:
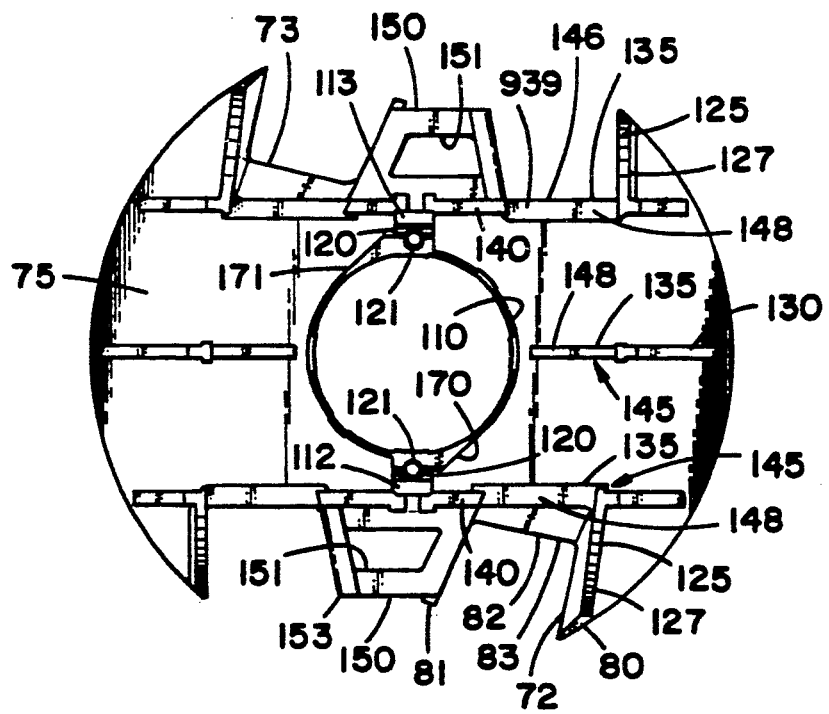
FIG. 7 is an end elevational view of the arrangement shown in FIGS. 5 and 6.
Figure 6:
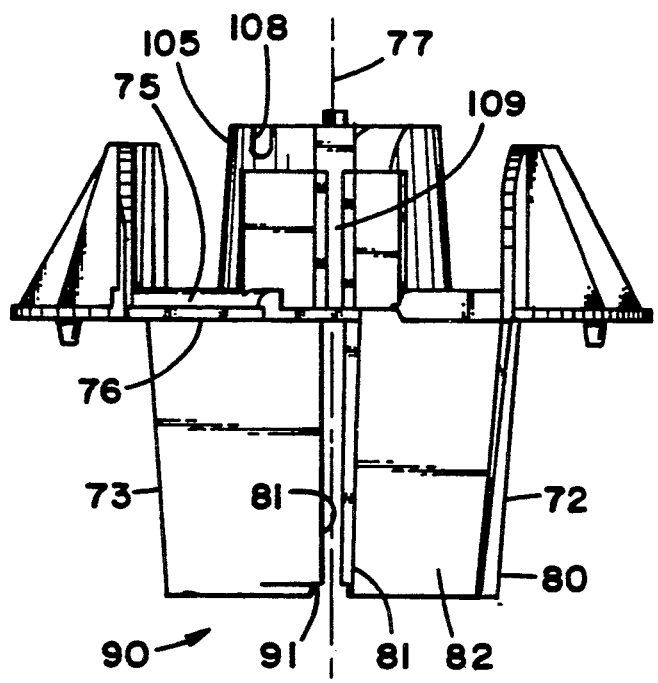
FIG. 6 is a side elevational view of the end cap illustrated in FIG. 5.
Figure 8:
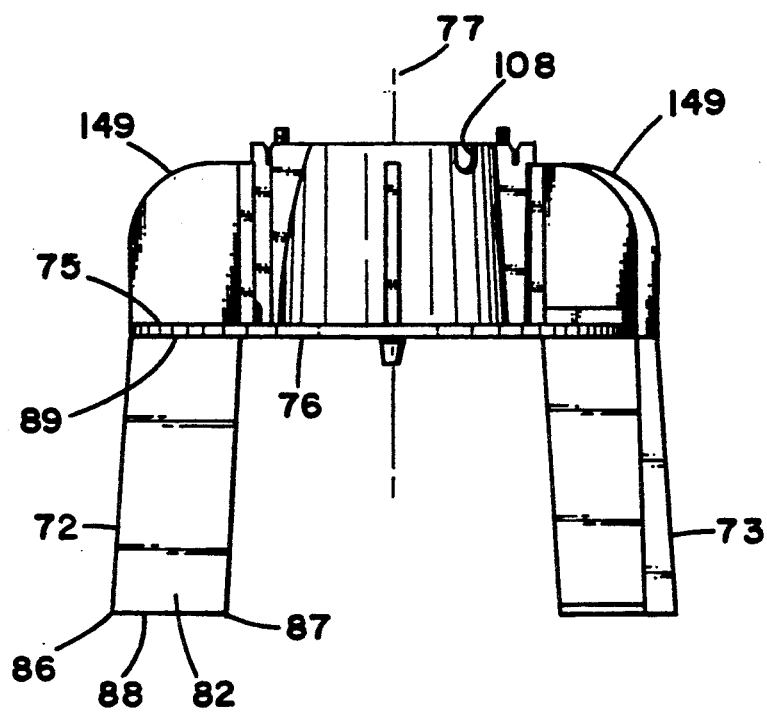
FIG. 8 is a side elevational view of the arrangement shown in FIGS. 5 and 6.

Referring especially to FIGS. 6, 7 and 8, head portion 71 includes outer surface 75 and opposite inner surface 76 ("inner" referring in this context to that surface which faces the other end cap in the assembled rotor; "outer" referring in this context to that surface which faces away from the other end cap in the assembled rotor). The legs 72, 73 extend or project from inner surface 76, FIGS. 5 and 7. Structures, FIG. 5, extending or projecting from outer surface 75 provide for wire coil positioning, wire lead attachments, mounting on the rotary shaft, air flow for cooling, etc. More specific descriptions of these structural features are provided hereinbelow.

Referring to FIGS. 5, 6 and 7, each of the legs 72, 73 comprises three panels. For the preferred embodiment, legs 72 and 73 are identical in shape and are positioned as called for by the 180° (or two-fold) axis of symmetry 77, FIG. 6. A detailed description of structure will be provided with respect to leg 72; and, it will be understood that a similar structural description also applies to leg 73 in the preferred embodiment. Referring to FIGS. 5, 6, 7, 8 and 9, leg 72 comprises outer panel 80, inner panel 81 and central panel 82. Central panel 82 extends between panels 80 and 81. The three panels define a leg 73 moving a central longitudinal leg channel 83 therein.

Referring to FIGS. 5, 6, 7, 8 and 9, the outer panel 80 of each leg 72, 73 is skewed or twisted inwardly from being flat or planar. Also, each central panel 82 is skewed or twisted, FIG. 8. Skewed panel 80 is oriented to align with or engage edge portion 55, FIG. 4, in the laminate 24. Similarly, skewed panel 82 is oriented to align with or engage edge portion 56 in laminate 24. Thus legs 72 and 73 accommodate the stack of laminates 24 in the skewed arrangement. Preferably, surfaces 80, 82 are skewed over their extension so that the laminate most remote from the head portion 71 is skewed or rotated 12°, about the rotor axis 30, relative to that laminate 24 positioned adjacent to head portion 71, with the laminates in between rotated evenly throughout the 12°. Since generally each laminate is about 0.635 mm thick and the respective head portions 71 of the end cap 16, 17 are typically positioned about 55 mm apart in a preferred application for a 4000 watt generator, generally about 86 to 89 laminates 24 are used in the stack, each rotated about 0.138° (skew angle) relative to the next adjacent one. The skew angle is determined by dividing the number of laminates 24 in the stack into 12°.

Figure 9:
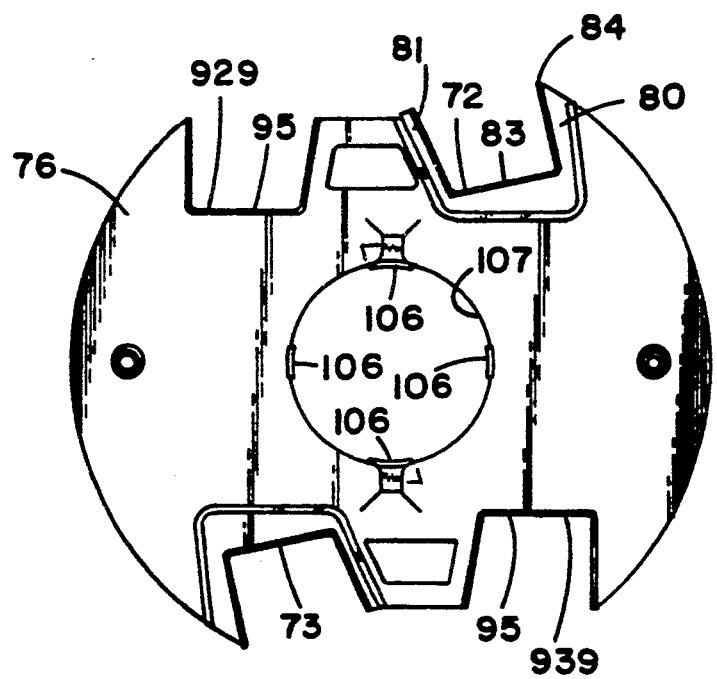
FIG. 9 is an end elevational view of the arrangement shown in FIGS. 5, 6, 7 and 8; the view of FIG. 9 being opposite to that of the view in FIG. 7.

Herein, when it is said that outer panel 80 is skewed, it is meant that its surface is constructed as if twisted from the planar, generally with corner 84 twisted toward panel 81 somewhat (see FIGS. 5 and 9). Herein when it is said that central panel 82 is skewed, it is meant that it has been constructed as if it has been twisted from the planar by twisting corner 87 toward the viewer as in FIG. 8, and corner 86 away from the viewer in FIG. 8. Alternately phrased, it is constructed as if edge 88 has been grabbed and twisted counterclockwise (FIG. 8) relative to upper edge 89. A "twist" of about 6° (totaling 12° since one edge [88, 89] is "twisted up" and the other [89, 88] is "twisted down") throughout the length of extension of panel 82 will achieve or accommodate the desired amount of skewing described hereinabove. By "twist" in this context it is not meant to be suggested that construction involves twisting; a molding process may be used to produce a surface which appears as though it was twisted from the planar.

Overall assembly of the end caps 16, 17 and laminates 24 will be understood by reference to FIG. 10, a fragmentary, exploded, perspective view of a rotor according to the present invention. In FIG. 10, end caps 16 and 17 are shown exploded, with laminates 24 positioned therebetween.

Referring to FIGS. 5, 6, 7 and 10, the inner panel 81 of each of legs 72, 73 terminates at a bottom edge 90 with outer step 91 spaced therefrom. The purposes of edge 90 and step 91 will be apparent from review of exploded FIG. 10. When the system is assembled, the bottom edge 92, 93 of each of the legs 72, 73 is directed into a corresponding recess 92a, 93a, in the head portion 71 of the other end cap 16, 17. Edge 90 is directed into the appropriate one of recesses 92a, 93a, to abut ridge 95. Steps 91 provide for secure, strong engagement. Thus, recesses 92a, 93a; the ends 92, 93 of legs 72, 73; and, edges 90 and steps 91, 95 interact to facilitate assembly with appropriate orientation of the engaging end caps 16, 17 with one another. That is, the symmetry desired is readily obtained. The two end caps 16 and 17 in an assembled rotor 3 may be held together by a variety of means including mechanical and, if desired, chemical (adhesives and the like). Preferably, a slip or friction fit is used.

Referring to FIG. 10, anchor pin 54 in surface 76 of head portion 71 is viewable ready to receive anchor hole 51 in the closest adjacent one of laminates 24. Thus the first laminate can be readily secured in position. Pin 54 is tapered to accommodate skewing of the next adjacent laminate in a stack of laminates positioned between the end caps 16, 17.

Referring to FIGS. 2 and 10, recesses 92a, 93a and legs 72, 73 generally define four longitudinal leg channels 97 in legs 72, 73, extending between the respective head portions 71 of the two end caps 16 and 17. The four channels 97 define two pair, 100 and 101 respectively, of channels 97 for receipt of wire coils 19 and 20, one coil 19, 20 extending through one of each of the pair of channels (FIG. 2). That is, each wire coil is wound within an appropriate pair of channels, to create the rotor. At 102 in FIG. 2, a short extension of wire 19 communicating between the two coils 19, 20 is shown.

Attention is directed to FIG. 11. FIG. 11 is an end view of the rotor assembly 3 of FIG. 2, shown without the wire coils therein. The two pairs of channels, 100 and 101, are readily depicted. From FIG. 11, a particular advantage of an assembly according to the present invention will be understood. While the rotor assembly accommodates and generates a desired skewing of the rotor laminates quite readily, from viewing FIG. 11 it will be seen that the pairs 100 and 101 of channels 97 are oriented such that the coils 19, 20 can be wound therein without substantial skewing. Thus, the coils 19, 20 can be positioned within channels 100 and 101 quite readily with more or less conventional wire coil winding equipment. That is, the wire for coils 19, 20 need not be coiled in a substantially skewed form. With respect to this, attention is directed to FIG. 2, wherein the coils 19, 20 are visible and shown with relatively little skewing therein.

Attention is now directed to FIG. 5, and structural features positioned on surface 75 of head portion 71. Each end cap 16, 17 includes a central cone 105 extending outwardly from surface 75, for secure mounting on the rotor shaft 15, FIG. 2. Cone 105 includes interference ribs 106, FIG. 9, positioned on an inner surface 107 thereof for convenient mounting on the rotor shaft 15.

The cone 105 includes U-shaped bites or recesses 108 therein, FIGS. 6 and 8. The bites or recesses 108 may be used to selectively position and secure end caps 16, 17 on the shaft 15, FIG. 2, upon engagement with a pin or the like, not shown, positioned thereon. Although each cone 105 is shown provided with two recesses 108, it is foreseen that generally only one at a time, if any, would be used. The provision of two such recesses 108, oriented 180° rotationally relative to one another, provides for ease of assembly and mounting as a result of providing symmetry; i.e., identical end caps 16, 17 can be used for both ends without concern for proper orientation on the shaft 15. Groove 109 may be used to index the end caps 16, 17 relative to a mechanical coil winding apparatus used to coil the wire onto the rotor, during assembly.

Positioned rotationally 180° (opposite) from one another, along an exterior surface 110 of cone 105, are positioned first and second wire terminal blocks 112 and 113. The two wire terminal blocks 112 and 113 may be, and are shown to be, identical to one another. Each block 112, 113 includes a longitudinal (transverse) slot; bite or channel 120 in which an extension of wire is received, when the rotor is assembled. Each block 112, 113 also includes extending downwardly or orthogonal to its longitudinal channel 120, a downwardly directed bore 121, FIG. 7, in which a terminal post, described hereinbelow, of the collector ring assembly 23, FIG. 2, is operably received, to provide electrical contact between the wire and the collector ring assembly. The bore 121 is directed to intersect slot 120, but is preferably off-set slightly from a center thereof. Adjacent terminal blocks 112 and 113 are orientation grooves 125 which can orient the rotor coil during the mechanical winding of the rotor assembly. The particular preferred structure illustrated for the wire terminal blocks 112 and 113 leads to advantages of constructions according to the present invention and further detail regarding this is therefore given hereinbelow.

Referring again to FIG. 5, each of end caps 16, 17 includes four corner retaining walls, panels or retainers 125. These may be viewed as comprising a first pair 126 and a second pair 127; each pair 26, 27 being associated with one coil of wire, FIG. 2. Struts or flanges 128 support the retaining walls 125.

Each end cap 16, 17 also includes a pair of central vanes or struts 130 defining inner surfaces 131. Each one of the central struts 130 is associated with one of the pairs 126, 127 of retaining walls 125, to define the receiving channel for each coil. That is, for example, referring to FIG. 7, a pair 127 of retaining walls 125 and the central flange 130 positioned therebetween define an outer perimeter retaining structure for a coil as it passes across, i.e., over, head portion 71. In particular, the coil will extend through a longitudinal coil channel defined by the three recesses or gates indicated at 135. Gates 135 are in part defined by the associated pair of flanges 127 and the central strut 130 positioned therebetween. The recesses 135 are also partly defined by outer surface 110 of cone 105 and central vanes 140. In general, the longitudinal coil channel is defined on one side by the flanges 127 and strut 130, and on the other side by the cone 105 and vanes 140.

Referring to FIG. 7, recesses or gates 135 may be viewed as generally defining a single coil passageway or channel 145 extending between leg 72 and point 146 in recess 93a. A surface rib arrangement indicating three surface ribs 148 is positioned on surface 71, within channel 145 and extending thereacross, i.e., transversely thereof. When a wire coil is positioned (wound) within channel 145, it will extend over surface ribs 148. The surface ribs 148 will act as a spacer, separating much of the wire coil from surface 75, providing for an air flow space therebetween. This will facilitate cooling of the rotator coil. Each end cap 16, 17 includes means defining two longitudinal coil channels extending thereacross.

It is noted that corner flanges 125 include rounded or curved outer edges 149, FIGS. 5 and 8. This will decrease the likelihood that an extension of wire will become caught thereon, during the coil winding process; i.e., during assembly.

Still referring to FIG. 5, the inner panel 81 of each leg 72, 73 is supported at head portion 71 by an extension 150 having an aperture 151 therein. Extension 150 provides for strength and integrity of the associated leg 72, 73. Aperture 151 provides an air flow passageway, for cooling. It is noted that each extension 150 includes a rounded rib 153 therein, mounted at the edge directed toward an associated one of the recesses 92a, 93a. The rounded rib 153 provides added strength and reduces the likelihood of a wire becoming caught or damaged, during the winding process.

All of the features of end caps 16, 17 as described hereinabove, and depicted in the drawings, can be provided in an integral molded construction. For the preferred embodiment, end caps 16, 17 according to the present invention will be prepared by molding, for example, by injection molding processing. A desirable material for use in the preparation of such an arrangement is polybutylene terephthalate (PBT), a glass and mineral filled semicrystalline thermoplastic.

Arrangement for Anchoring Ends of the Wire and Providing Electrical Communication with the Collector Ring From FIGS. 12-14, advantageous construction which enables good electrical communication between ends 160 of the wire used in forming the coils 19, 20 on the rotor 3, and the collector ring assembly 23, will be understood. FIG. 12 is a fragmentary cross-sectional view of one of the end caps 16, taken generally along line 12—12, FIG. 11. FIG. 13 is an analogous view of the end cap 16, with a cross-sectional view of an associated collector ring assembly 23, generally as shown assembled in FIG. 2. FIG. 14 is a top cross-sectional view taken along line 14—14, FIG. 13.

Referring to FIG. 12, end cap 16 includes cone 105 and terminal blocks 112, 113. Terminal blocks 112, 113 include a longitudinal wire channel or bite 120 extending therethrough. The preferred channel 120 extends generally orthogonal to the rotor central axis 30 and tangentially to the cone 105. It also includes bore 121 directed downwardly thereinto.

In FIG. 12 wire ends 160 are shown extending through the longitudinal channels 120. Longitudinal channels 120 each includes therein a shelf 161 FIG. 13, on which the wire ends 160 are operationally positioned when collector ring assembly 23 is attached to end cap 16. (In FIG. 11 the wire ends 160 each being above the shelves 161; in FIG. 12 the wire end 160 being depicted resting on the associated shelf 161.) Each shelf 161 is partially within, but offset from intersection with a center of, the associated bore 121; i.e. each shelf 161 forms a wire support lip within the bore 121. The wire 160 is guided to shelf 161 and is held in place by guide structure or slot 162 when collector pins 165 of collector ring assembly 23 enter bores 121. Preferably shelf 161 is sized somewhat smaller than the diameter of the wire 160, preferably about 25 to 35 percent of the diameter of the wire. Thus, preferably the wire, when resting on shelf 161, extends over shelf 161 and into bore 121 by at least about 33 percent of its (the wire's) diameter.

From viewing FIGS. 7 and 12, it will be understood that the wire ends 160 can readily be positioned within slots 162, during a coiling process. The wire simply needs to be strung longitudinally through longitudinal channel 120, and pressed or pulled downwardly. The slot 162 can be shaped and oriented to ensure that the wire is positioned appropriately such that collector pin 165 will displace the wire onto shelf 161; see for example sloping walls 163, FIG. 12.

The collector ring assembly 23, FIG. 13, is provided with a conductor or terminal pin 165 having a central axis, oriented to be directed into bore 121. When the pin 165 is pushed into bore 121, it will engage the wire end 160, providing electrical connection. Preferably the pin 165 is provided with a plurality of splines, teeth or ridges 166, FIG. 12, so that it will strip through any insulation on the wire end 160 and cut or bite into the wire end 160, providing direct electrically conductive contact therewith. In this manner, a secure electrical connection is conveniently provided, simultaneously with wire stripping when the collector ring assembly 23 is attached to end cap 16.

Preferably, the terminal pin 165 is provided with a conical end 168 and a short, non-ridged extension 169 between end 168 and ridges 166, FIG. 13. The conical end 168 and extension 169 will tend to displace the wire end 160 onto shelf 161, as they are thrust therepast, distorting the shape of the wire and facilitating good electrical contact. With respect to this, attention is directed to FIG. 14 which is a top cross-sectional view taken along line 14—14, FIG. 13.

Referring to FIG. 2, it is foreseen that a single strand 169 of wire having two ends or end portions will be used to provide both coils on the rotor, with both ends terminating at the same end cap, one end portion in terminal block 112 and the other in terminal block 113. Both can be terminated in the same manner, anchored and positioned in the same manner, each being engaged by one of two pins in the collector ring assembly. Thus, according to the present invention, a particularly convenient arrangement is provided, for engagement between the wire of a rotor coil and a collector ring assembly.

Still referring to FIG. 7, preferably cone outer surface 110 includes two tangential surfaces 170, 171 thereon, one each of which is directed toward one of the two blocks 112, 113. The tangential surfaces 170, 171 provide for convenient direction of the wire ends during coiling.

It is foreseen that the unique electrical connection provided by structure according to the present invention may be applied in a variety of systems. Generally, defining the requirements for the electrical connection between the rotor magnet wire and the terminal pin requires two fundamental design principles. First, as suggested above, the insulation on the wire is pierced and then cleaned out of the contact area by the lead edge 174 of the splines, teeth, or ridges 166 of the pin. The "cleaned" areas (cuts) of the wire then form or squeeze over the ridge 166 as the pin is further inserted. The preferred forming of the wire is accomplished by the shape of the rigid cavity the wire is placed into and the diameter of the ridged pin inserted into that cavity. The total contact surface area where the bare copper portion of the magnet wire contacts the ridges of the pin should preferably be, at a minimum, equal to the cross-sectional area of the wire 160. Each ridge or spline, preferably, should not pierce an area more than one-third the diameter area of the wire, or the wire will tend to unacceptably lose its mechanical strength. In other words, in a preferred embodiment, the central axis of wire end 160 should not intersect the central axis of the terminal pin 165. The dimension of each bite taken by the ridge, as its passes through the wire, is defined by the length from the peak of the cut to its root, which, preferably, should be the thickness of the insulation of the magnet wire plus the thickness that would correspond to a bite equal to or less than one-third of the diameter of the wire.

The electrical ampacity (current-carrying capability) of the circuit is directly related to the number of bites or splines taken, and the surface areas of contact between the bare magnet wire and the pin splines. In addition, the pin should be of sufficient cross-sectional area to carry the circuit's amperage. When the contact area is equal to twice the magnet area, the temperature rise of the contact area is approximately equal to that of the magnet wire.

Preferably the core of the pin is steel, and the pin is provided with a copper coating at least about 0.002 inches thick. Steel is preferred for its strength and flexibility. Generally, the pin should be capable of flexing the same amount the generator shaft flexes due to engine firing torque. In other applications, the pin could be made out of brass, copper or other sufficiently hard electrically-conductive material. For the application shown, the steel pin is overplated with copper. The thickness of the copper plating is determined by the required circuit ampacity. In a typical application, as a collector ring for a rotor, the thickness should be about 0.002 inches. Preferably the copper plating is overcoated with tin, to prevent corrosion.

A Collector Ring Assembly

Figure 15:
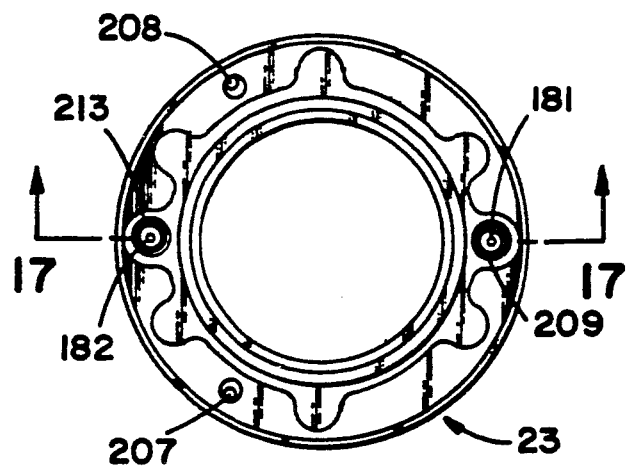
FIG. 15 is an end elevational view of a collector ring assembly for use in arrangements according to the present invention.
Figure 16:
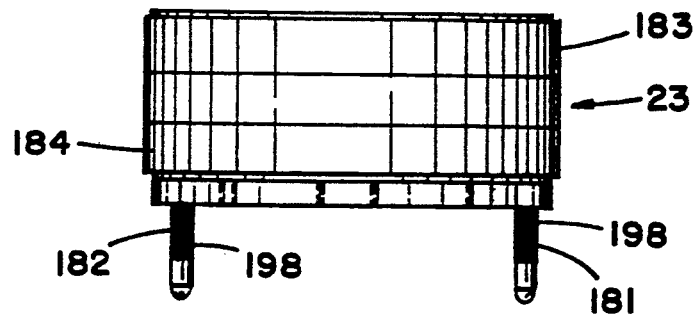
FIG. 16 is a side elevational view of the arrangement shown in FIG. 15.
Figure 17:
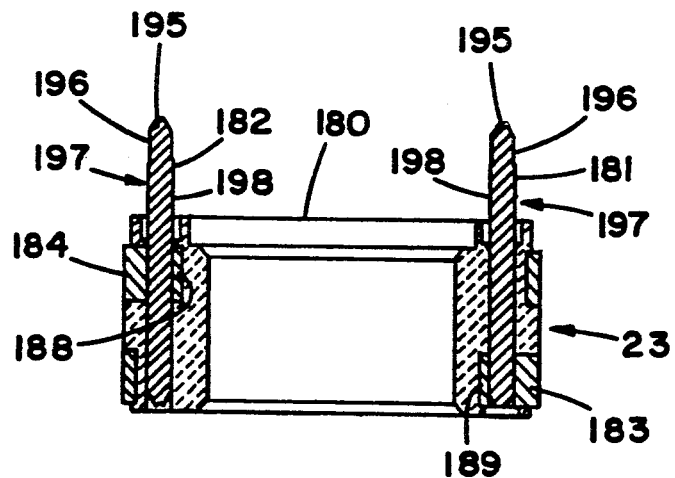
FIG. 17 is a cross-sectional view taken generally along line 17—17, FIG. 15.
Figure 18:
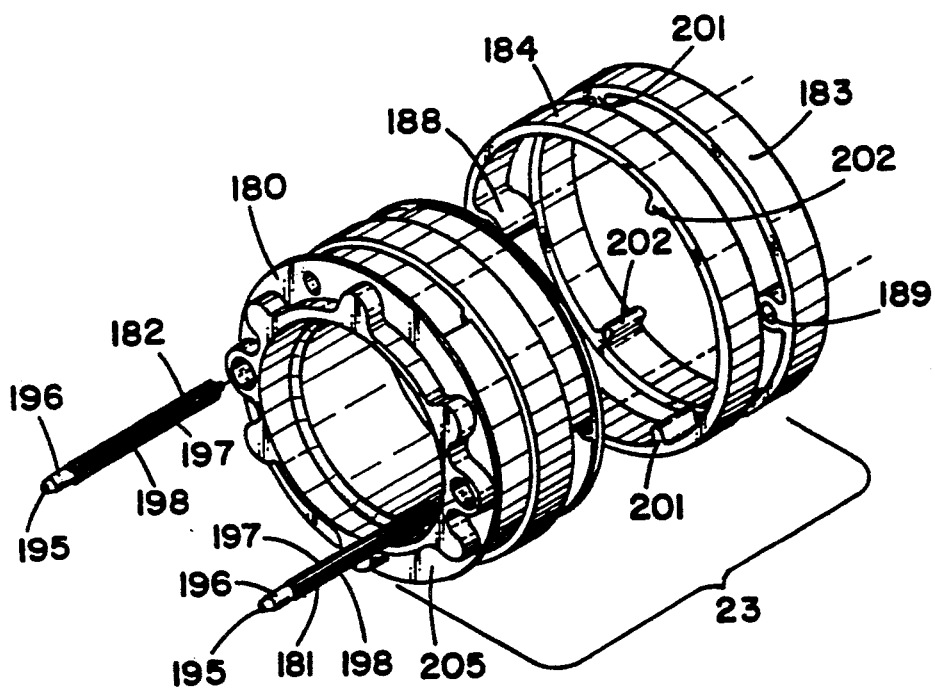
FIG. 18 is an exploded perspective view of the arrangement shown in FIGS. 15, 16, and 17.

A preferred collector ring assembly 23 for use in association with an assembly according to present invention is depicted in detail in FIGS. 15, 16, 17 and 18. In FIGS. 15 and 16, top and side views are shown. FIG. 17 is a cross-sectional view and FIG. 18 is a perspective exploded view.

Referring to FIG. 17, the collector ring assembly 23 comprises an insulator body 180 having positioned therein first and second terminals or pins 181 and 182, and first and second (spaced) collector rings 183 an 184. Pin 181 is shown in electrically-conductive contact with ring 183 but not ring 184; and, pin 182 is shown in electrically-conductive contact with ring 184, but not ring 183. The rings 183 and 184 are not in direct electrically-conductive contact with one another, the central electrical circuit between the two, rather, being provided in part by the wire of the rotor. The collector rings are oriented so that they may be contacted by brushes or the like, to transmit electrical current signal from the voltage regulator within the coil stator to the coils in the rotor.

Referring to FIG. 18, ring 184 includes a terminal boss 188 thereon, for receipt of an end of pin 182; and, ring 183 includes a boss 189 thereon for receipt of an end of pin 181. Receipt of pin 181 in boss 189, and receipt of pin 182 in boss 188 is readily seen in FIG. 17.

Still referring to FIGS. 17 and 18, preferably for use in a rotor assembly such as that depicted in the drawings, the pins 181 and 182 are substantially identical, each having a conical end 195, a smooth lead-in section 196 and an extension 197 having splines, ridges or teeth 198 thereon. Typical magnet wire for use in a rotor such as that depicted in the drawings is #21 AWG copper wire having a bare diameter of about 0.0285 inches with a wire insulation about 0.0027 inches thick. For use in providing electrical contact with such a wire, preferably the splines, ridges or bites 198 are about 0.012 inches high, i.e., of a relief of about 0.007 inches relative to the diameter of lead-in 196; and, preferably there are about 15 splines positioned (evenly) around the outer diameter of the pin. Preferably, the pin is about 0.1459 to 0.1400 inches in diameter. In this manner, each cut or bite will be as generally described above, with the engagement between the pin and the wire involving no less than about 2 splines and preferably at least about 4 splines.

It is appreciated that the number of splines 198 on each pin 181 and 182 is in direct relationship to the diameter of the magnet wire to which each pin 181 or 182 makes electrical contact. The electrical contact area (interface) preferably will equal or exceed the cross-sectional area of the magnet wire. The number of splines then is determined by the depth necessary for each spline to pierce the magnet insulation plus the number of splines needed to equal or exceed the cross-sectional area of the magnet wire multiplied by the electrical contact area. Generally each spline should not penetrate more than 33% the diameter of the wire.

Referring to FIG. 18, the insulator body 180 is preferably made of a glass-filled polyester thermo plastic; the assembly being molded by an injection or transfer process such that the plastic is shot around the rings during assembly. The pins can then be positioned within appropriately-positioned and molded holes. The construction of collector rings according to the present invention is highly advantageous for a number of reasons including that the rings are well-adapted for providing electrical communication with wires held upon rotor end caps according to the present invention. In addition, the connection can be conveniently and quickly made. Also, such collector rings are readily assembled and manufactured, for example as described in the next section.

Preferred Methods of Preparing Collector Rings According to the Present Invention Collector ring assembly 23 is constructed from a mold which has a round cavity cut from a solid rectangular block of steel. The mold includes a support pin arrangement comprising at least six support pins (three in a first or base mold portion and three in a second or top mold portion) which are oriented to support first and second collector rings 183 and 184 in spaced relation to one another during the molding process.

The first collector ring 183 is placed into a first mold portion such that it drops to the bottom of the mold cavity. Second collector ring 184 lies in a plane which is substantially parallel to the plane of first collector ring 183. Both first collector ring 183 and second collector ring 184 are positioned around the same central axis when both rings, 183 and 184, are placed within the mold. The second ring 184 is rotated about this center axis such that terminal pin boss 188 and spacer ridges 201 and 202 of ring 184 are radially spaced from terminal pin boss 189 and spacer ridges 201 and 202 of first collector ring 183. In the preferred embodiment, as shown in FIG. 18, the second collector ring 184 is radially spaced about 180° with respect to the first collector ring 183.

When second collector ring 184 is inserted into the mold, the support pins inside the cavity of the first mold portion catch the terminal pin boss 188 of ring 184 and spacer ridges 201 and 202, FIG. 18, and space second ring 184 from first ring 183. These support pins also prevent rings 183 and 184 from moving when a plastic is inserted into the cavity and provide cavities (apertures 209 and 213) which accept pins 181 and 182.

The second mold portion is then closed against the first mold portion to form a complete mold. A plastic material is then introduced into the cavity through a diaphragm or similar design gate. Preferably, the support pins of the second mold portion are oriented 180° from those in the first mold portion. These support pins also prevent rings 183 and 184 from moving when the plastic is inserted or shot under pressure into the cavity of the mold.

After the plastic material is introduced into the cavity of the mold, the molding pressure is held until the plastic is cured and a collector ring body is formed. The collector ring body is comprised of an insulator body 180 and collector rings 183 and 184, FIG. 17. The collector ring body is then lifted from the cavity of the first mold portion. As seen in FIG. 15, insulator body 180 has a topical surface 205 with three apertures 207, 208 and 209 which are caused by the pins of the top portion of the mold. The insulator body 180 also has a bottom surface 210, which has three artifact apertures 211, 212 and 213 which are formed from the pins from the first mold portion as seen in FIG. 11. Apertures 209 and 213 transverse insulator body 180 from the topical surface 205 to the bottom surface 210 and are capable of accepting electrical pins.

Electrical pins 181 and 182 are then pressed into apertures 209 and 213, respectively, such that pin 181 is in electrical contact with ring 183 and pin 182 is in electrical contact with ring 184. Pins 181 and 182 have substantially the same size and length.

The construction of the collector ring assembly according to the present method is highly advantageous because it utilizes a minimum number of parts and a simple molding method. The method can easily be automated and allow for mass production of collector rings in a minimum amount of time.

Example of a Working Embodiment.

As seen in FIG. 2, rotor assembly 3 has two end caps 16 and 17 which are positioned at each end of the plurality of laminations, in this example 55 mm away from each other. End cap 16, FIGS. 6–10, has a first and second leg 72 and 73 which extend 57 mm from inner surface 76 to bottom edge 90. Panels 80, 81 and 82 have a thickness of 0.5 mm. Ridge 95 which is a part of inner panel 81 has a thickness of 2.5 mm, a length of 6.0 mm and a width of 0.5 mm. When end caps 16 and 17 are oriented such that recesses 92a, 93a; the ends 92, 93 of leg 72, 73; and, edges 90 and steps 91, 91 interact, two pairs of channels, 100 and 101, are formed and have a circumferential length of 2.58 mm each. Channels 100 and 101 accommodate coils 19 and 20 which are comprised of a single continuous strand of wire 22 which is comprised of #21 AWG copper wire. Single continuous strand of wire 22 has a nominal diameter of 0.724 mm and has a length of about 450 meters. Continuous strand of wire 22 is wound around channel 100 about 700 times creating coil 19. Continuous strand of wire 22 is also wound about 700 times around channel 101.

A fully assembled rotor 3 includes thereon a plurality of laminants 24 about which wire coils 19 and 20 are wound. Plurality of laminants 24 are stacked between surfaces 44 and 45 of end caps 16 and 17, respectively. In a preferred embodiment, plurality of laminants 24 are made of a furomagnetic material and have a thickness of 0.023 inch. Fully assembled rotor 3 will have about 86 laminants stacked between surfaces 44 and 45 of end caps 16 and 17, respectively, for a 4000 watt generator. The number of laminates 24 will depend and is in proportion to the wattage rating of a generator.

Plurality of laminants 24 include a center bore 50 which has a radius of 43.18 mm. Anchor holes 51, FIG. 2, are provided for engagement with one of the other pins 53 and 54 which have a height of 5 mm extending from surfaces 44 and 45 of end caps 16 and 17, respectively. Pins 53 and 54 have a conical shape and engage about 8 laminants. Anchor holes 51 have a diameter of 5 m which allow the plurality of laminants 24 to contact either surface 44 or 45.

When a plurality of laminants 25 is stacked between legs 72 and 73, maintenance of the appropriate skewing in the stack of laminants results. The laminants are gradually skewed from surface 41 to surface 45 for a total of about 12°.

Each end cap 16 and 17 includes a central cone 105 extending 40 mm from surface 75, FIG. 5, for securing and mounting on the rotor shaft. End caps 16 and 17 further include four corner retaining walls, panels or retainers 125 which extend 36 mm from surface 75. Each end cap 16 and 17 also includes a pair of central veins which rise 31 mm from surface 75.

End caps 16 and 17 include surface ribs 148 which act as spacers separating much of the wire coil from surface 75. Surface ribs 148 rise 6 mm from surface 75 and have a length of 18 to 20 mm between outer surface 110 of cone 105 and central vein 130.

Terminal blocks 112 and 113 include longitudinal slot or channel 120 which has a depth of 4.2 mm, a width of 0.78 mm and a length of 8 mm. Each block 112 and 113 also includes extending downwardly or orthoginal to its longitudinal channel 120, a downwardly directed bore 121 which has a diameter of 3.23 mm and a depth of 14 mm. Longitudinal channel 120 includes therein a shelf 161 which has a width of 1.11 mm and a length of 3 mm. The shelf is partially within but offset from bore 121.

The collector ring assembly, FIG. 19, is provided with a first and second terminals or pins 181 and 182. Pins 181 and 182 have a diameter of 3.63 mm and a length of 40 mm which includes smooth lead-in section 196 and an extension 97. Extension 197 has a plurality of splines, ridges or teeth 198 thereon which extend 34.2 mm from the end of the smooth lead-in section 196. The core of the pin is steel and has a copper coating at least about 0.05 mm thick. The splines, ridges or teeth 198 are evenly spaced radially around pins 181 and 182 and have a height of 0.23 mm extending from the diameter of pins 181 and 182.

Pins 181 and 182 are in electrically-conductive contact with rings 183 and 184, respectively, and are spaced 180° from each other. Rings 183 and 184 are not in direct electrically-conducted contact with one another. The rings 183 and 184 are made of a copper alloy material and have a diameter of 58.47 mm. Rings 183 and 184 include terminal bosses 189 and 188, respectively, which are attached to the respective rings and provide receipt of pins 183 and 182, respectively. Terminal boss 188 and 189 have a radius of 3.26 mm, a depth of 7.57 mm and a thickness of 1.6 mm. Rings 183 and 184 have spacer ridges 201 and 202 which are positioned 120° clockwise and counterclockwise from terminal bosses 188 and 189 such that spacer ridges 201 and 202 are 120° radially spaced from one another. Spacer ridges 201 and 202 have a height of 7.57 mm which is equal to the height of collector rings 183 and 184. Spacer ridges 201 and 202 have a thickness of 2 mm and protrude inwardly a length of 3 mm.

Collector ring assembly 23 includes an insulator body 180 having an inner diameter of 34.94 mm and a thickness of about 9.7 mm. The overall height of the collector ring is 27.4 mm. The insulator body causes collector rings 183 and 184 to be spaced 7 mm apart from one another.

What is claimed is:
1. A rotor assembly comprising:
   (a) first and second end caps; each of said end caps having a head portion and a pair of legs; each end cap leg having at least one skewed wall panel oriented to accept a skewed stack of laminates;
   (b) a skewed stack of laminates positioned between said first and second end cap head portions; each laminate of said skewed stack of laminates having an edge portion aligned with a skewed wall panel of said end cap legs; and,
   (c) a wire strand wrapped in first and second coils around said first and second end caps.
2. A rotor assembly according to claim 1 wherein:
   (a) said first and second end caps are substantially identical to one another.
3. A rotor assembly according to claim 1 wherein:
   (a) each of said legs of said first and second end caps has an outer panel, an inner panel, and a central panel; said outer, inner and central panels of each leg defining a longitudinal channel extending between said first and second end cap head portions; and,
   (b) said first and second coils extend through said longitudinal channels defined by said outer, inner and central panels.
4. A rotor assembly according to claim 3 wherein:
   (a) said outer panel of each leg is skewed from a plane; and,
   (b) said central panel of each leg is skewed from a plane.
5. A rotor assembly according to claim 1 wherein:
   (a) each of said end cap head portions has an outer surface and an inner surface;
      (i) said pair of legs of each end cap projecting from said end cap inner surface;
      (ii) said end cap outer surface having a surface rib arrangement thereon;
   (b) said first and second wire coils being positioned in extension over said surface rib arrangement of each end cap; said surface rib arrangement generating an air flow space between each wire coil and each end cap outer surface.
6. A rotor assembly according to claim 5 wherein:
   (a) each surface rib arrangement comprises six surface ribs oriented with three ribs positioned to receive said first coil thereover and three ribs positioned to receive said second coil thereover.
7. A rotor assembly according to claim 1 wherein:
   (a) each of said end cap head portions has an outer surface and an inner surface;
      (i) said pair of legs of each end cap projecting from said end cap inner surface;

(ii) each end cap outer surface having four corner panels extending therefrom in first and second aligned pairs; said corner panels defining first and second coil channels extending on and across each end cap outer surface; and (b) each of said first and second coils extends through an associated one of said first and second coil channels on said end cap outer surface.

8. A rotor assembly according to claim 7 including:

(a) a central mounting cone extending from each end cap outer surface;
   (i) each of said first and second coil channels being defined generally between a pair of said corner panels and said central mounting cone.

9. An assembly according to claim 8 including:

(a) a pair of central gussets on said end cap outer surface, one of said gussets being associated with each coil channel to further define same.

10. A rotor assembly according to claim 7 wherein:

(a) each of said four corner panels has a rounded outer corner.

11. A rotor assembly according to claim 1 wherein:

(a) each of said end cap head portions has an outer surface and an inner surface;
   (i) said pair of legs of each end cap projecting from said end cap inner surface;
   (ii) at least one of said end cap outer surfaces includes first and second wire terminal blocks thereon; each of said first and second wire terminal blocks having a longitudinal wire bite therein for receipt of a wire end portion; and (b) said wire strand has first and second end portions; said wire strand first end portion being positioned within said longitudinal wire bite of said first wire terminal block; and, said wire strand second end portion being positioned within said longitudinal wire bite of said second wire terminal block;

(c) said rotor assembly includes a collector ring assembly in direct electrically conductive communication with each of said wire end portions by contact with portions thereof received within said longitudinal wire bites.

12. A rotor assembly according to claim 11 wherein:

(a) said end caps define a rotor central axis of rotation;

(b) each wire terminal block has a pin bore therein oriented generally coplanar with, and extending generally parallel to, said rotor central axis of rotation; said each pin bore extending in communication with the wire bite in the same wire terminal block; and, (c) said collector ring includes first and second conductor pins;
   (i) said first conductor pin extending into a pin bore in said first wire terminal block, and into electrically conductive engagement with a wire and portion extending therethrough; and,
   (ii) said second conductor pin extensive into a pin bore in said second wire terminal block, and into electrically conductive engagement with a wire end portion extending therethrough.

13. A rotor assembly according to claim 11 wherein:

(a) each of said conductor pins has a central longitudinal axis and is positioned with said axis extending generally orthogonal to the one of said wire end portions engaged thereby.

14. A rotor assembly according to claim 13 wherein:

(a) each of said conductor pins has an outer surface with a plurality of longitudinal splines thereon; and, (b) each conductor pin is oriented with at least one of its splines cut into the associated ones of said wire end portions, to provide electrical communication therebetween.

15. A rotor assembly according to claim 14 wherein each pin has at least four splines which cut into the wire end portion associated therewith.

16. A rotor assembly according to claim 12 wherein:

(a) the longitudinal wire bite of each wire terminal block has a lower shelf therein; said lower shelf terminating in said pin bore and defining a wire support lip within said pin bore;

(b) the wire end portion in each wire terminal block is pressed against the wire support lip therein, by one of the conductor pins of said collector ring.

17. A rotor assembly according to claim 1 wherein each of said end caps comprises a single, integral, molded construction.

* * * * *

UNITED STATES PATENT AND TRADEMARK OFFICE
CERTIFICATE OF CORRECTION

PATENT NO. : 5,144,182

DATED : SEP. 1, 1992

INVENTOR(S) : LEMMER ET AL.

It is certified that error appears in the above-identified patent and that said Letters Patent is hereby corrected as shown below:

On the Title Page, Item [57], line 7, change "and" to --end--.
At column 15, line 19, change "5 m" to --5mm--
At column 15, line 21, change "25" to --24--
At column 15, line 51, change "97" following the first use of the word "extension" to --197--
At column 15, line 67, change "183" to --181--

Signed and Sealed this

Thirty-first Day of May, 1994

Attest:

BRUCE LEHMAN

*Attesting Officer*          *Commissioner of Patents and Trademarks*